(12) United States Patent
Nevalainen et al.

(10) Patent No.: US 10,399,744 B2
(45) Date of Patent: Sep. 3, 2019

(54) HEAT-SEALABLE BIODEGRADABLE PACKAGING MATERIAL, A PACKAGE MADE THEREOF, AND USE OF A RESIN IN EXTRUSION COATING

(75) Inventors: Kimmo Nevalainen, Kotka (FI); Ville Ribu, Lappeenranta (FI)

(73) Assignee: STORA ENSO OYJ, Helsinki (FI)

( * ) Notice: Subject to any disclaimer, the term of this patent is extended or adjusted under 35 U.S.C. 154(b) by 419 days.

(21) Appl. No.: 14/122,959

(22) PCT Filed: May 31, 2012

(86) PCT No.: PCT/FI2012/050543
§ 371 (c)(1),
(2), (4) Date: Nov. 29, 2013

(87) PCT Pub. No.: WO2012/164171
PCT Pub. Date: Dec. 6, 2012

(65) Prior Publication Data
US 2014/0099502 A1   Apr. 10, 2014

(30) Foreign Application Priority Data

May 31, 2011 (FI) .................................. 20115537

(51) Int. Cl.
*B65D 3/22* (2006.01)
*B32B 27/10* (2006.01)
*B32B 27/36* (2006.01)
*B32B 29/00* (2006.01)
*B65D 25/14* (2006.01)

(52) U.S. Cl.
CPC .............. *B65D 25/14* (2013.01); *B32B 27/10* (2013.01); *B32B 27/36* (2013.01); *B32B 29/002* (2013.01); *B65D 3/22* (2013.01); *B32B 2270/00* (2013.01); *B32B 2307/31* (2013.01); *B32B 2307/7163* (2013.01); *B32B 2439/00* (2013.01); *B32B 2439/70* (2013.01); *Y10T 428/2826* (2015.01)

(58) Field of Classification Search
CPC .......... B65D 25/14; B32B 27/36; C08L 67/04
See application file for complete search history.

(56) References Cited

U.S. PATENT DOCUMENTS

| | | | |
|---|---|---|---|
| 5,252,646 A | 10/1993 | Iovine et al. | |
| 5,257,491 A * | 11/1993 | Rouyer | B29B 13/022 206/447 |
| 5,457,175 A | 10/1995 | Scharrer et al. | |
| 5,506,011 A * | 4/1996 | Farrell | B32B 27/10 428/34.2 |
| 5,723,566 A | 3/1998 | Salvetat et al. | |
| 5,844,063 A | 12/1998 | Salvetat et al. | |
| RE36,177 E * | 4/1999 | Rouyer | B29B 13/022 206/447 |
| 6,160,083 A | 12/2000 | Thompson et al. | |
| 6,645,584 B1 * | 11/2003 | Kuusipalo | B32B 27/10 428/34.2 |
| 6,767,972 B1 * | 7/2004 | Irick, Jr. | C08L 67/02 524/211 |
| 7,422,782 B2 | 9/2008 | Haedt et al. | |
| 2002/0065345 A1 | 5/2002 | Narita et al. | |
| 2002/0178506 A1 | 12/2002 | Corzani et al. | |
| 2003/0216492 A1 * | 11/2003 | Bowden | B65D 65/466 524/47 |
| 2004/0213941 A1 * | 10/2004 | Whitehouse | C08K 5/34 428/40.1 |
| 2005/0192410 A1 | 9/2005 | Scheer et al. | |
| 2007/0259195 A1 | 11/2007 | Chou et al. | |
| 2008/0176015 A1 * | 7/2008 | Yamamatsu | B32B 27/10 428/34.2 |
| 2008/0311320 A1 * | 12/2008 | Hiruma | B32B 27/08 428/34.9 |
| 2009/0239433 A1 * | 9/2009 | Kurihara | B32B 27/36 442/164 |
| 2010/0305280 A1 * | 12/2010 | Whitehouse | A47L 13/17 525/450 |
| 2010/0323196 A1 * | 12/2010 | Dou | B32B 27/08 428/349 |
| 2013/0004760 A1 * | 1/2013 | Pellingra | C08J 7/04 428/220 |
| 2013/0071677 A1 * | 3/2013 | Penttinen | B32B 27/10 428/480 |
| 2013/0137562 A1 * | 5/2013 | Penttinen | B29C 65/02 493/148 |
| 2014/0147604 A1 * | 5/2014 | Nevalainen | D21H 27/10 428/34.2 |
| 2015/0274367 A1 * | 10/2015 | Nevalainen | B32B 27/10 206/524.3 |
| 2015/0284133 A1 * | 10/2015 | Nevalainen | B32B 27/36 206/557 |

FOREIGN PATENT DOCUMENTS

EP   0699800 A2   3/1996
EP   1297949 A1   4/2003
(Continued)

OTHER PUBLICATIONS http://www.industrycortex.com/datasheets/profile/3794770, 2016.*
(Continued)

*Primary Examiner* — Liam J Heincer
(74) *Attorney, Agent, or Firm* — Birch, Stewart, Kolasch & Birch, LLP

(57) ABSTRACT

The invention concerns a heat-sealable biodegradable packaging material, which comprises a fibrous substrate and one or more polymer coating layers extruded onto said substrate. According to the invention the packaging material includes at least one polymer coating layer containing polylactide and at least about 1 weight-% of terpene phenolic resin blended therewith. The invention further concerns a heat-sealed product package made from the packaging material, as well as uses of the resin as blends with polylactide in extrusion coating, for improving line speed and neck-in in extrusion, adhesivity of the coating to the fibrous substrate, and heat-sealability of the coating.

15 Claims, 4 Drawing Sheets

(56) References Cited

FOREIGN PATENT DOCUMENTS

| EP | 1327663 A1 | | 7/2003 |
|---|---|---|---|
| EP | 1094944 B1 | | 9/2004 |
| JP | 2513091 B2 | | 4/1996 |
| JP | 2005002200 A | * | 1/2005 |

OTHER PUBLICATIONS

Machine translation of JP 2005002200 A, 2017.*
Rauwendaal (Extrusion, Encyclopedia of Polymer Science and Technology, vol. 2, 2001, p. 497-558).*
First Office Action dated Nov. 20, 2014, in Chinese Patent Application No. 201280026617.X, with English translation.
Finish Search Report dated Feb. 27, 2012, issued in Finish Application No. 20115537.
PCT/ISA/210—International Search Report dated Oct. 1, 2012, issued in PCT/FI2012/050543.
PCT/ISA/237—Written Opinion of the International Searching Authority dated Oct. 1, 2012, issued in PCT/FI2012/050543.

* cited by examiner

HEAT-SEALABLE BIODEGRADABLE PACKAGING MATERIAL, A PACKAGE MADE THEREOF, AND USE OF A RESIN IN EXTRUSION COATING

The present invention concerns a heat-sealable biodegradable packaging material, which comprises a fibrous substrate and one or more polymer coating layers extruded onto said substrate. The invention also concerns a heat-sealed product package comprising the packaging material according to the invention, as well as uses of a resin in extrusion coating, in particular to produce the packaging material and the package according to the invention.

The fibre-based packaging material of product packages, such as packing paper or board, is usually provided with a polymeric coating that makes the package tight and by means of which the package can be closed by heat sealing. Multi-layer coatings can comprise an inner EVOH, PET or polyamide layer that provides the material with an effective barrier to water vapour and oxygen, and an outer polyolefin layer that makes the material heat-sealable. One disadvantage of the said widely-used coating polymers is, however, that they are not biodegradable.

Polylactide (PLA), which has reasonably good moisture and gas barrier properties that are adequate to many applications, has been used as the coating polymer of biodegradable packaging material; however, its use involves a number of problems. Polylactide as such is stiff and fragile, requiring a high extrusion temperature and a fairly large layer thickness to stick to the fibre substrate of the packaging material. Because of the high temperature, polylactide runs the risk of breaking, and in extrusion, the edges of a molten web tend to tear and pin holes easily remain in the extruded layer.

As a solution to said problems, the specification EP-1094944 B1 discloses an inner adhesion layer, which is co-extruded together with an outer polylactide layer and which consists of a biodegradable polymer, examples of which, according to the specification, include some commercial copolyesters, cellulose esters, and polyester amides. They facilitate the extrusion of polylactide and provide adhesion that prevents the coating from peeling off the fibre substrate.

Another problem with the use of polylactide in the outer coating layer of the packaging material is its fairly high melting point, and the resulting poor heat sealing ability. As an improvement to this, the specification US-2002/0065345 A1 discloses a biodegradable aliphatic polyester that is blended with polylactide, its portion in the mixture being at least 9%, and a tackifier, its portion in the mixture being at least 1%. As suitable aliphatic polyesters, the publication mentions polycaprolactone (PLC) and polybutylene succinate adipate (PBSA). According to the patent specification, the mixture can be extruded into a film, which can be axially or biaxially stretched and which can be attached to the fibre substrate by lamination. As a result, polymer-coated biodegradable packaging material is obtained, which has a considerably improved heat sealing ability.

The specification US 2005/0192410 A1 describes polylactide films and coatings, wherein the processability of polylactide is improved by blending with it 10-40 weight-% of polycaprolactone and 5-10 weight-% of mineral particles. According to the specification, the mixture can be used in extrusion coating, but there is no reference to its adhesion to the fibre substrate or to its heat sealing ability in the specification. Instead, the specification describes the intermediate layers between the carrier and the PLA-based coating layer or the top layers that come on top of the PLA layer; cf. section [0039] in the specification.

The specification US 2007/0259195 A1 describes polylactide-based films, which contain, blended therewith, 0.1-10 weight-% of biodegradable polymeric additive, the purpose of which is to increase the crystallinity of the polylactide, improving its heat resistance. As examples of such additives, the specification presents FEPOL 2040 marketed by Far Eastern Textile, Taiwan, and Ecoflex marketed by BASF, both of which comprise polybutylene adipate terephthalate (PBAT). According to the specification, the mixtures can be extruded onto the fibre substrate in a conventional manner, but there is no reference to the adhesion of the mixture to the substrate or to the heat sealing ability of the coating thus obtained. In the specification, the intended improved heat resistance of PLA does not, however, refer to an improvement of the heat sealing ability but rather to its weakening.

The problem solved by the present invention is to provide polymer-coated, biodegradable packaging material, wherein the coating containing a polylactide blend has both an improved adhesion to the fibre substrate and improved heat sealing ability. From these premises the aim is in particular to reduce the share of the polymer blended with polylactide, while said polymer blend is extrudable and completely biodegradable. According to the invention, the solution is that the biodegradable polymer coating layer contains polylactide and at least about 1 weight-% of terpene phenolic resin blended therewith.

DETAILED DESCRIPTION OF THE PREFERRED EMBODIMENTS

Figure 1:
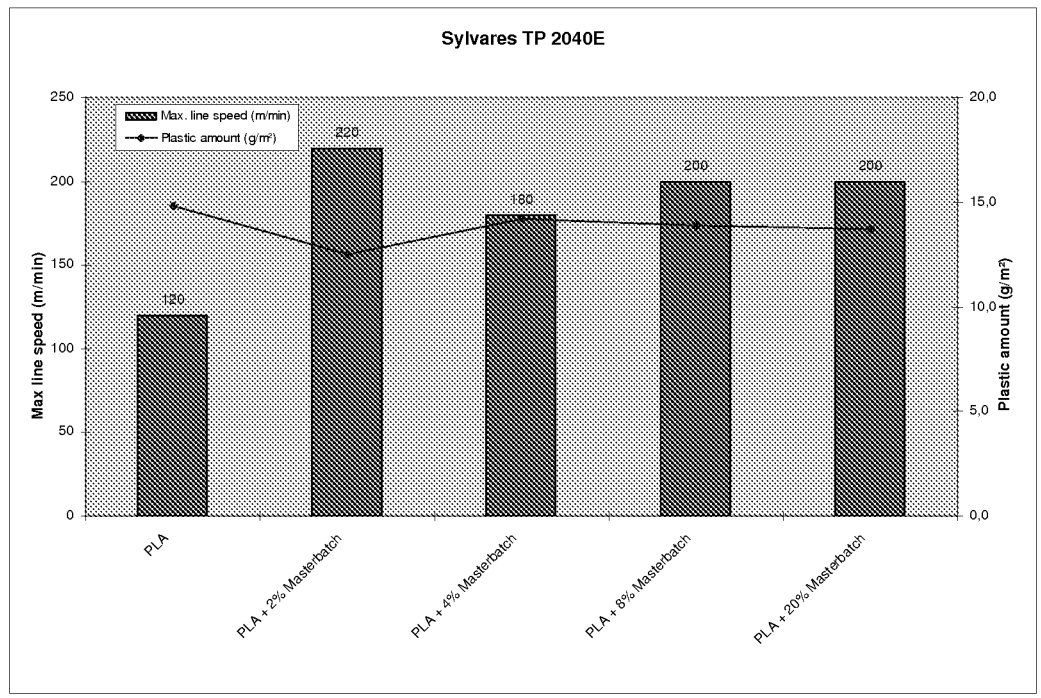
FIG. 1 shows the effect of the blended terpene phenolic resin on the line speed in extrusion.

The terpene used to produce the resin is a low-cost, coniferous wood-based material. To the applicant's knowledge such resin has not been previously used for polymer blend coatings of biodegradable paper or board packages. Examples of the terpenes are a-pinene and p-pinene. Combined with the use of polylactide terpene phenolic resin increases the share of biorenewable materials contained in the biodegradable packages.

The invention covers use of terpene phenolic resins made from at least phenol and terpene monomers. One or more further monomers may be used for the resin. As noted above, the terpene monomer may be for instance a-pinene or p-pinene.

Examples of the phenol monomer are phenol and various alkyl and alkoxyphenols, and examples of the further monomers are cyclic or acyclic unsaturated olefins, such as e.g. diisobutylene and cyclopentadiene. Manufacture of such products has been described in the patent literature, the patents U.S. Pat. Nos. 5,457,175, 5,723,566, 5,844,063 and 6,160,083 being cited as examples, Terpene phenolic resins useful in the invention are available as commercial products.

Preferably the biodegradable polymer coating layer contains at least 2 weight-%, more preferably at least 4 weight-%, and most preferably at least 10 weight-% of terpene phenolic resin blended with polylactide. The share of polylactide in said blends would be at most 98 weight-%, more preferably at most 96 weight-%, and most preferably at most 90 weight-%, respectively.

The upper limit for the share of terpene phenolic resin in the blend may be 20 weight-%, preferably 15 weight-%, the remaining 80 weight-%, preferably 85 weight-%, being polylactide. Suitably the blend would substantially consist of 5-15 weight-% of terpene phenolic resin and 85-95 weight-% of polylactide.

The fibrous substrate in the packaging material may be paper or board, paperboard as well as cardboard.

The biodegradable polymer coating layer as discussed above may be in a direct contact with the fibrous substrate of the packaging material. The terpene phenolic resin serves to improve adhesion of the coating layer to the underlying fibrous substrate. In case of a multilayer coating said coating layer would be the lower-most layer.

The biodegradable polymer coating layer as discussed above may also form the uppermost surface layer of the coated packaging material. In this case the terpene phenolic resin serves to improve the heat-sealability of the polymer coated packaging material. If the coating is a monolayer coating its aim is to improve both adhesion to the fibrous substrate and heat-sealability.

In case of a multilayer coating each layer should consist of biodegradable polymers so as to secure biodegradability of the packaging material as a whole. The material may have a polymer coating on one side or on both sides thereof. The coatings on the opposite sides of the fibrous substrate may be similar or differ from each other.

The heat-sealed product package according to the invention is a closed package partially or, preferably, completely made of the packaging material as described above. Such sealed packages may be carton packages for dry products such as chocolate, tobacco, cosmetics, bottled alcoholic beverages, etc., in which at least the outer surface is polymer coated, the heat seal having the coated outer side of the package sealed to the coated or uncoated inner side of the package.

The invention also includes heat-sealed liquid packages, in which at least the inner surface of the package has a polymer coating to prevent wetting of the fibrous substrate. Preferably the fibrous substrate is polymer coated on both sides. The inner side of the package may have a multilayer coating including at least one oxygen barrier layer and an innermost heat-seal layer.

The invention even comprises heat-sealed containers made of the packaging material according to the invention, such as disposable drinking cups for hot or cold drinks such as coffee, juice etc., in which the polymer coating lies in the inside of the container in contact with the drink.

The invention includes use of terpene phenolic resin as a blend with polylactide to improve the heat-sealability of an extruded polymer coating layer made from said blend. An addition of 2 weight-% of the resin brought a clear improvement in terms of the hot air temperature needed for the heat-sealing, and increasing the share of the resin to 10 weight-% produced a progressively improving result as decreasing sealing air temperatures required.

The invention further includes use of terpene phenolic resin as a blend with polylactide for increased line speed in extrusion of a polymer coating layer comprising said blend. An addition as small as 1 weight-% of the resin allows nearly doubling the line speed as compared to pure polylactide, and additions in the range of 1-10 weight-% have been found to yield good results.

The invention even includes use of terpene phenolic resin as a blend with polylactide for reduced neck-in in extrusion of a polymer coating layer comprising said blend. A clear reduction is achieved by adding 2 weight-% of the resin to the blend, and an addition of 10 weight-% brings a significant further improvement.

In each case the blend is preferably used for extrusion of a polymer coating layer onto a fibrous paper or board substrate of a packaging material.

Furthermore, the invention includes use of terpene phenolic resin as a blend with polylactide for improved adhesion as a polymer coating layer comprising said blend is extruded onto a fibrous paper or board substrate of a packaging material. A significant improvement as compared to pure polylactide was found with additions of 4 to 10 weight-% of the resin in the blend. Due to the improvement the weight of the polymer coating layer may be reduced, with material savings as a result.

EXAMPLES

In the following the invention is illustrated by means of laboratory tests. Extrusion grade polylactide was used as the basic coating polymer, which was blended with various amounts of terpene phenolic resin Sylvares TP 2040E by Arizona Chemicals. 47 to 49 weight-% of the resin was first compounded with 53 to 51 weight-% of polylactide, respectively, to form a masterbatch, and 2, 4, 8 and 20 weight-% of the masterbatch was then blended with polylactide to obtain the test materials. Thus the shares of the resin in the test materials were about 1, 2, 4 and 10 weight-%, respectively.

The blended test materials were then extruded as monolayers onto one side of a cupboard substrate having a weight of 210 g/m$^2$, by varying the extruded coating weights and the line speed in extrusion. The results are shown in FIGS. 1-5.

The effect of the blended terpene phenolic resin on the line speed in extrusion can be seen from the measured results in FIG. 1. By way of trials the maximal line speed for each blend was determined, and the corresponding polymer coating weight was measured. Due to the technique the amounts of extruded polymer, measured as coating weights, varied slightly for the different blends. However, the improvement as compared to the highest possible line speed with pure polylactide was remarkable even with the lowest terpene phenolic resin content of 1 weight-%, and was maintained throughout the tested range of 1-10 weight-%. The working properties of polylactide are thus significantly improved by the blending according to the invention.

Figure 2:
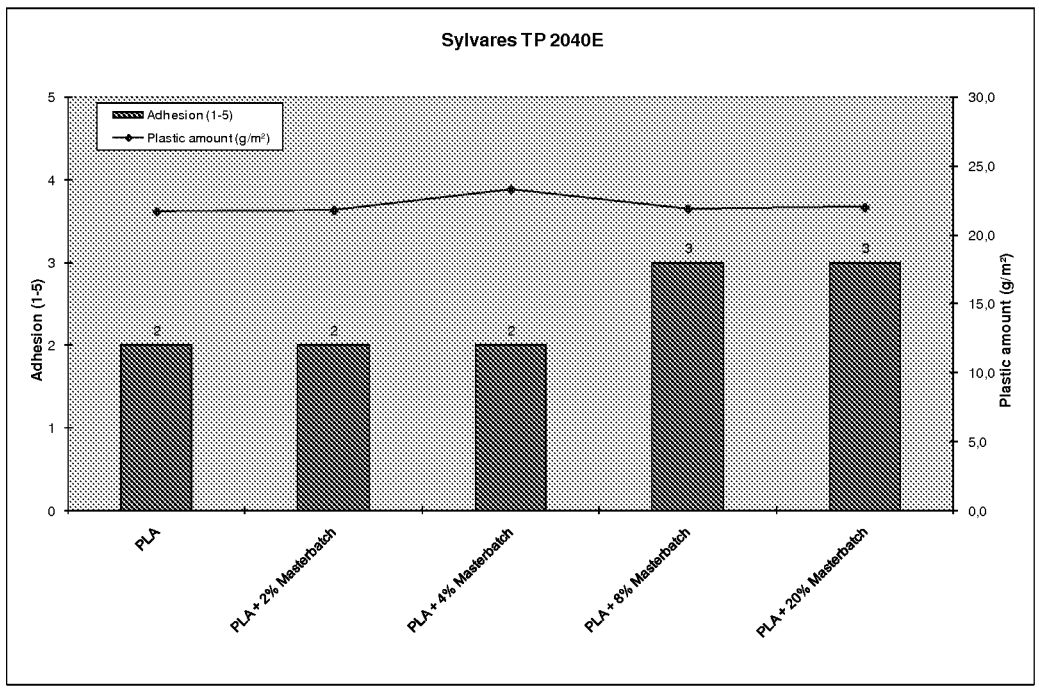
FIGS. 2 and 3 show the effect of the blended terpene phenolic resin on adhesion of the extruded polylactide coatings to the board substrate.
Figure 3:
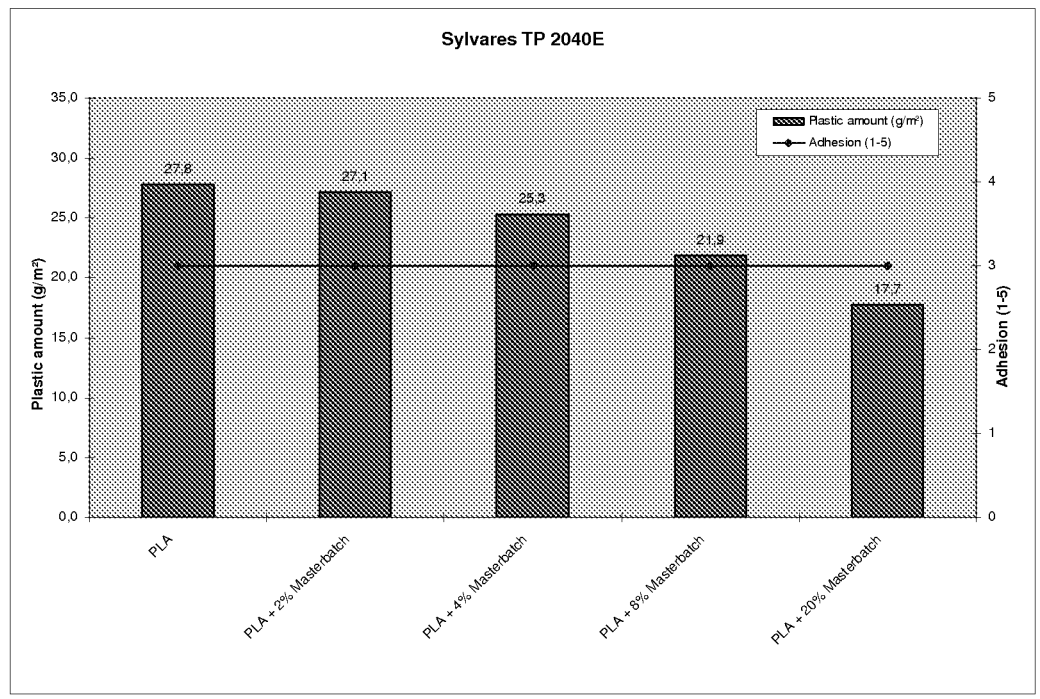

FIGS. 2 and 3 show the effect of the blended terpene phenolic resin on adhesion of the extruded polylactide coatings to the board substrate. Adhesion is classified on a scale of 0 to 5, wherein adhesion level 0 represents no adhesion at all. At level 1 the coating is slightly sticking to the board surface, not loose any more, while level 5 represents the best possible adhesion. Coating weight of about 22 g/m$^2$ was used in the test series of FIG. 2. A 4 weight-% share of the resin in the blend brought a rise of the adhesion level from 2 to 3.

The test series of FIG. 3 sought out the minimum amount of extruded polymer in order to achieve the adhesion level 3. It is seen that increase of the blended terpene phenolic resin progressively improves adhesion, as demonstrated by the diminishing amount of the polymer required.

Figure 4:
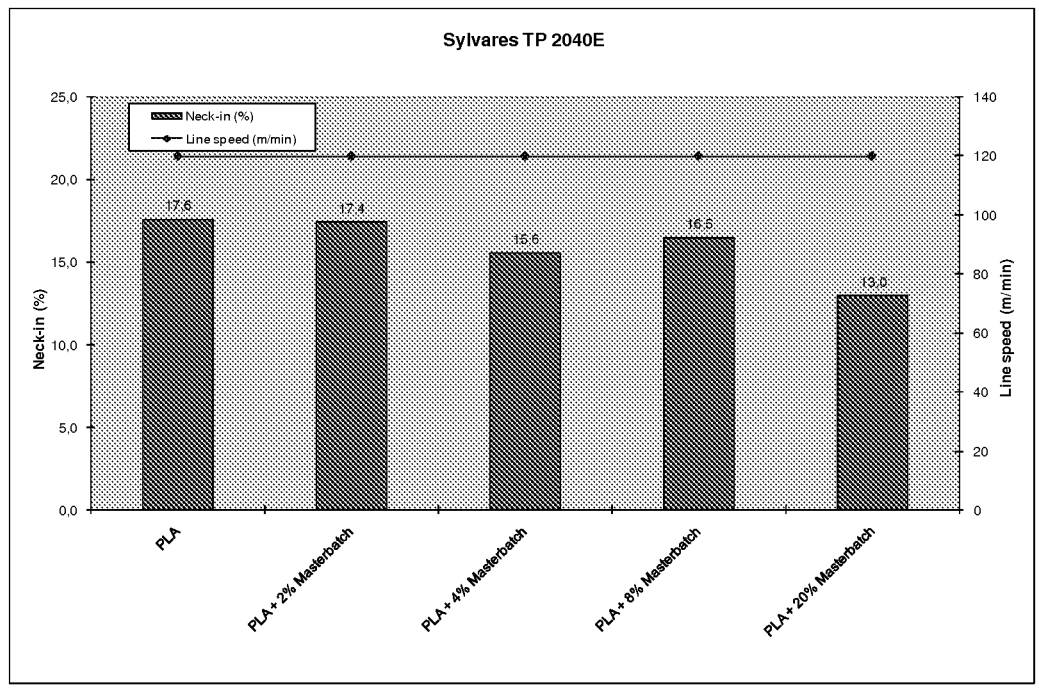
FIG. 4 shows the effect of the blended terpene phenolic resin on the neck-in in extrusion.

FIG. 4 shows the effect of the blended terpene phenolic resin on the neck-in in extrusion. A minor improvement was achieved with smaller amounts of blended resin, whereas a share of 10 weight-% of the resin produced a considerable improvement. Reduction of neck-in helps the control of the extrusion process.

Figure 5:
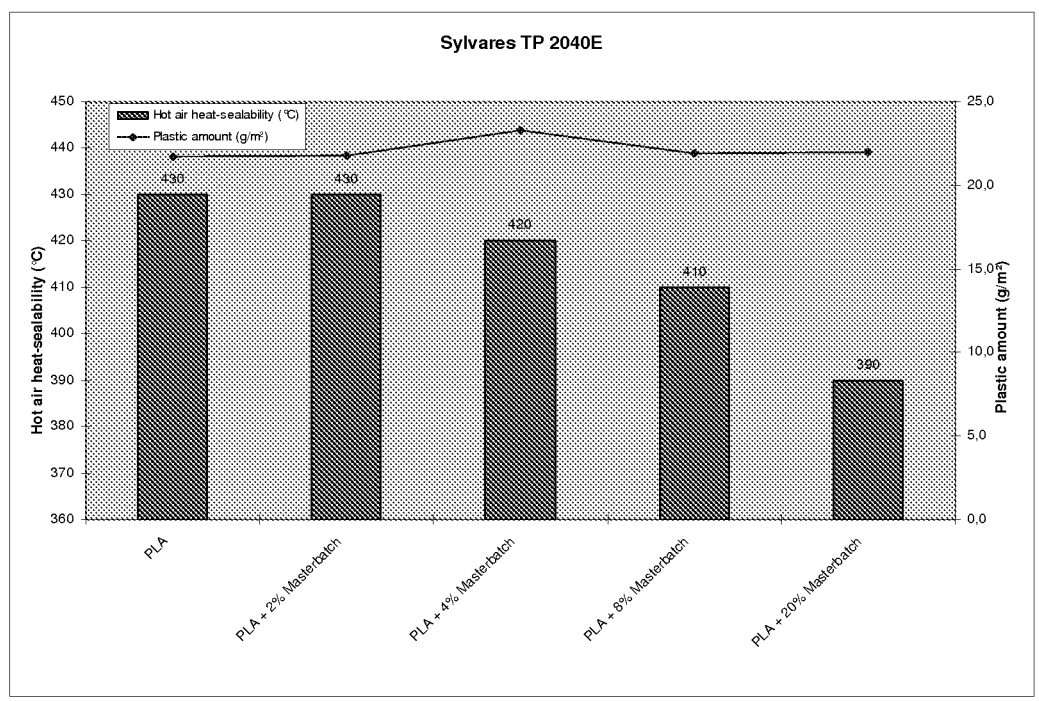
FIG. 5 shows the effect of the blended terpene phenolic resin on the uncoated topside of the fibrous board substrate at low air temperature.

In the test series of FIG. 5 the lowest hot air temperature for achieving complete heat-sealing of the coating layer to the uncoated top side of the fibrous board sustrate was determined. From an addition of 2 weight-% on blended terpene phenolic resin progressively improved the heat-sealability of polylactide as demonstrated by the decreasing sealing temperature required.

FIGS. 6-9 show as examples four structural embodiments of the packaging material according to the invention. There are extruded or coextruded monolayer or multilayer coatings of a blend of polylactide and a terpene phenolic resin ("PLA blend") and mere polylactide ("PLA") on one side or on both sides of a fibrous paper or board base ("board"). The share of the terpene phenolic resin in the blend may vary from 2 to 20 weight-%. The base may be paper, paperboard or cardboard of a weight of 40 to 350 $g/m^2$, preferably a cupboard or a liquid package board of 170 to 350 $g/m^2$.

Figure 6:
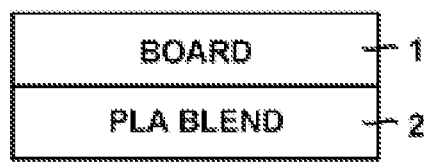
FIGS. 6-9 show, as examples, four structural embodiments of the packaging material according to the invention.
Figure 7:
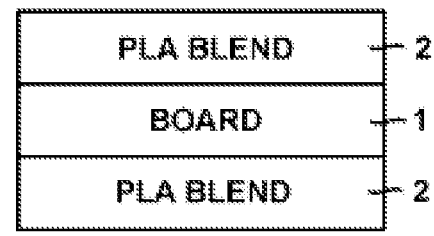
Figure 8:
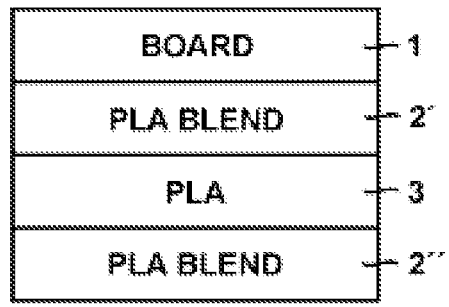
Figure 9:
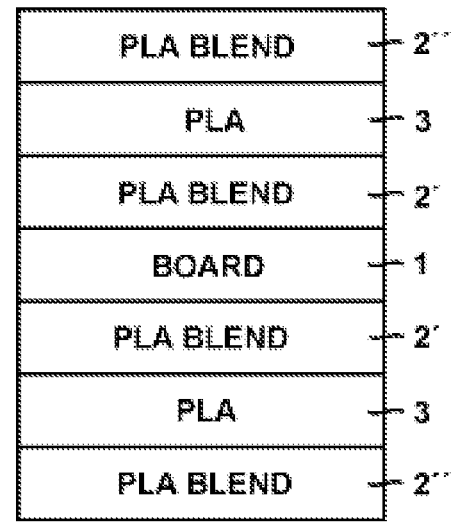

More particularly, FIG. 6 shows the base 1 with a single extruded coating layer 2 of the PLA blend. The weight of this monolayer 2 may be from 10 to 30 $g/m^2$. In FIG. 7 there is such a PLA blend layer 2 on both sides of the base 1. FIG. 8 shows a coextruded multilayer coating with an innermost PLA blend layer 2', a middle layer of PLA 3, and an outermost PLA blend layer 2". The weight of each of the three layers 2', 3 and 2" may be from 4 to 13 $g/m^2$. The total weight of the multilayer coating is thus 12-39 $g/m^2$. PLA is the cheaper polymer material in the blend, and including a middle layer 3 of PLA serves to add to the total thickness of the coating while reducing its cost. FIG. 9 shows similar multilayer coatings on both sides of the base 1.

If the packaging material has extruded polymer coatings on both sides, the coatings on the opposite sides need not be identical. There may be a monolayer coating on one side and a multilayer coating on the other side of the fibrous base. It is also possible to include in multilayer coatings layers of other biodegradable polymers suitable for extrusion coating, preferably in blends with polylactide. Examples of such other polymers are PBAT (polybutylene adipate terephtalate), PBSA (polybutylene succinate adipate), PBS (polybutylene succinate), PHA (polyhydroxy alkanoate), PHB (polyhydroxy butyrate), PHBV (polyhydroxybutyrate hydroxyvalerate), PGA (polyglycolic acid), PEG (polyethylene glycol), PCL (polycaprolactane), and starch based biopolymers. The innermost and/or the outermost layer of the multilayer structure shall be of the blend of PLA and the terpene phenolic resin, however.

The invention claimed is:
1. A method of manufacturing a heat-sealed biodegradable container or package, comprising the steps of
   (a) extruding a polymer blend consisting of polylactide and at least about 1 weight-% and at most 10 weight-% of terpene phenolic resin as a melt onto a fibrous board base having a basis weight of 170 to 350 $g/m^2$ on a moving line, to produce a heat-sealable board comprising a coating layer of said polymer blend on said board base, wherein said coating layer of said polymer blend is a monolayer having a basis weight of 10 to 30 $g/m^2$, and
   (b) forming the container or package from the polymer coated board thus obtained by introduction of heat to melt said polymer coating and by heat sealing the board sides or surfaces together.
2. The method of claim 1, wherein said polymer coating layer contains polylactide and at least about 2 weight-% of terpene phenolic resin blended therewith.
3. The method of claim 1, wherein said polymer coating layer contains at least 4 weight-% of terpene phenolic resin blended with polylactide.
4. The method of claim 1, wherein said polymer coating layer contains at least 10 weight-% of terpene phenolic resin blended with polylactide.
5. The method of claim 1, wherein said polymer coating layer contains at most 20 weight-% of terpene phenolic resin blended with polylactide.
6. The method of claim 1, wherein said polymer coating layer is in a direct contact with the fibrous board base.
7. The method of claim 1, wherein said polymer coating layer is the uppermost surface layer of a multilayer coating coextruded at step (a) onto the fibrous board base.
8. The method of claim 1, wherein the terpene phenolic resin is made from α-pinene and phenol.
9. The method of claim 1, wherein the heat sealability of said polymer coating layer is improved by blending the minor share of terpene phenolic resin with a share of at least 80 wt-% of polylactide.
10. The method of claim 1, wherein the line speed in extrusion of said polymer coating layer is increased by blending the minor share of terpene phenolic resin with a share of at least 80 wt-% of polylactide.
11. The method of claim 1, wherein the neck-in in extrusion of said polymer coating layer is reduced by blending the minor share of terpene phenolic resin with a share of at least 80 wt-% of polylactide.
12. The method of claim 1, wherein adhesion of said polymer coating layer to the fibrous board base is improved by blending the minor share of terpene phenolic resin with a share of at least 80 wt-% of polylactide.
13. The method of claim 1, wherein said package is a heat-sealed product package.
14. The method of claim 1, wherein said container is a disposable drinking cup.
15. The method of claim 1, wherein the polymer coating is heat sealed by use of hot air.

* * * * *